United States Patent [19]

Decoster et al.

[11] Patent Number: 5,166,917

[45] Date of Patent: Nov. 24, 1992

[54] CENTERING DEVICE FOR DISKS OF DIFFERENT SIZES FOR USE IN A DISC-RECORD PLAYER

[75] Inventors: Michel H. F. Decoster; Libert H. A. M. Camps, both of Hasselt, Belgium; Petrus L. A. Rouws, Eindhoven, Netherlands; Omar P. L. P. Van Heusden, Hasselt, Belgium

[73] Assignee: U.S. Philips Corporation, New York, N.Y.

[21] Appl. No.: 790,110

[22] Filed: Nov. 8, 1991

Related U.S. Application Data

[63] Continuation of Ser. No. 630,702, Dec. 20, 1990, abandoned.

[30] Foreign Application Priority Data

Dec. 20, 1989 [NL] Netherlands .................. 8903113

[51] Int. Cl.⁵ ............................................ G11B 25/04
[52] U.S. Cl. .................... 369/77.1; 369/75.2; 369/270
[58] Field of Search ............... 369/77.1, 77.2, 75.1, 369/270, 194; 360/99.02, 99.06

[56] References Cited

U.S. PATENT DOCUMENTS

| | | | |
|---|---|---|---|
| 4,498,162 | 2/1985 | Schatteman | 369/77.1 |
| 4,523,306 | 6/1985 | Staar | 369/77.1 |
| 4,674,079 | 6/1987 | Agostini | 369/77.1 |
| 4,969,140 | 11/1990 | Koiwa et al. | 369/77.1 |

Primary Examiner—Stuart S. Levy
Assistant Examiner—Tan Nguyen
Attorney, Agent, or Firm—David R. Treacy

[57] ABSTRACT

The player comprises a frame, a turntable for the information carriers, which turntable is rotatable about an axis of rotation during operation, and a centering device for centering said information carriers relative to a centering axis. The centering device comprises a pair of first pivotal arms, which are each movable about a first pivotal axis parallel to the centering axis, and a first centering element constructed for cooperation with the circumferential edge of the information carriers. The centering device further comprises a pair of second pivotal arms which each comprise a second centering element constructed for cooperation with the circumferential edges of information carriers, the first centering elements and the second centering elements together being disposed at least substantially on a circle concentric with the centering axis in at least one position of the first pivotal arms and the second pivotal arms relative to each other.

14 Claims, 2 Drawing Sheets

CENTERING DEVICE FOR DISKS OF DIFFERENT SIZES FOR USE IN A DISC-RECORD PLAYER

This is a continuation of application Ser. No. 07/630,702, filed Dec. 20, 1990 now abandoned.

BACKGROUND OF THE INVENTION

1. Field of the Invention

The invention relates to a disc-record player comprising a device for scanning rotating disc-shaped information carriers, comprising a frame, a turntable, which is rotatable about an axis of rotation during operation and which comprises a supporting surface for information carriers having a circumferential edge, and a centering device for bringing said information carriers into a centered position relative to a centering axis, the centering device comprising a pair of pivotal arms which are each movable about respective pivotal axes which extend parallel to the centering axis, which pivotal arms each comprising a centering element constructed to cooperate with the circumferential edges of said information carriers.

The invention also relates to a centering device for use in a disc-record player.

2. Description of the Related Art

A disc-record player comprising a centering device is known from U.S. patent specification Ser. No. 2,508,715 (herewith incorporated by reference). The known disc-record player is suitable for playing phonograph records of two types having different diameters. For this purpose the player comprises a turntable, a pick-up arm, and a centering device for centering the phonograph records relative to the turntable. The centering device comprises two pivotal arms which are coupled to each other and a fixed and a pivotable stop. The pivotal arms each have a cylindrical centering element for cooperation with the circumferential edge of records of both types when the relevant record is slid into and out of the player. The fixed and the pivotable stop serve for limiting the loading movement of a large and a small record respectively, the pivotable stop being coupled to the pivotal arms via a mechanism. In the known centering device the two cylindrical-centering elements in conjunction with the fixed stop and the pivotable stop respectively serve for approximately centering a phonograph record relative to the turntable. Exact centering of a record relative to the turntable is effected by means of an axially movable centering spindle, the dimensioning being such that in the operating position the record situated on the turntable is clear of the centering elements and the stops.

Using the prior-art device in modern disc-record players by means of which optical discs such as CDs can be inscribed and/or read would give rise to some problems. For example, owing to the presence of stops the prior-art centering device requires a disc-position detection which operates very accurately in order to ensure that a disc being loaded into the player is stopped duly to preclude a collision with one of the stops, which may damage the vulnerable optical disc. Another disadvantage of the prior-art centering device is the comparatively large space needed to bring the pivotable stop into its non-operational position, which makes it difficult to construct a disc-record player of small overall height. A further disadvantage is that the stops are situated at locations which in optical disc-record players are generally occupied by an optical scanning unit. Moreover, it is to be noted that in the known disc-record player the means proposed for disengaging the disc-record situated on the turntable from the centering elements and the stops are inadequate to obtain the desired and generally required clearance between an optical disc and the centering means.

SUMMARY OF THE INVENTION

It is an object of the invention to modify the disc-record player of the type defined in the opening paragraph in such a manner, by improving the centering device, that it is suitable as an optical disc-record player.

To this end the disc-record player in accordance with the invention is characterized in that the centering device comprises a pair of further pivotal arms which each comprise a further centering element constructed to cooperate with the circumferential edges of said information carriers, the centering elements and the further centering elements together being disposed at least substantially on a circle concentric with the centering axis in at least one position of the pivotal arms and the further pivotal arms relative to each other. Preferably, each of the centering elements contacts the disc in a respective different one of the four quadrants of the circle, so that the disc is centered both longitudinally and transversely.

The disc-record player thus obtained is particularly suitable for inscribing and/or reading information tracks on optical or magneto-optical information carriers such as CDs and CD-singles. The disc-record player in accordance with the invention, which can have a small overall height, comprises a reliable centering device which can be assembled from a small number of parts and which enables said information carriers to be automatically centered with a high precision and without the risk of damage. A further advantage of the disc-record player in accordance with the invention is that after an information carrier to be scanned has been placed on the turntable the pivotal arms and the further pivotal arms can be pivoted away simply to bring them at an adequate distance from the information carrier to be scanned. Moreover, the centering device can be positioned in the disc-record player in such a way that no special steps are needed to mount the device for scanning the information carriers.

An embodiment of the disc-record player in accordance with the invention, which enables information carriers of different diameters to be centered without the use of additional parts, is characterized in that in at least one further position of the pivotal arms and the further pivotal arms relative to each other the centering elements and the further centering elements are together disposed at least substantially on a further circle concentric with the centering axis.

A practical embodiment of the disc-record player in accordance with the invention is characterized in that the further pivotal arms are movable about a further pivotal axis parallel to the centering axis.

An embodiment which minimizes losses, in particular as result of friction, during the pivotal movement of the pivotal arms and the further pivotal arms, in which the pivotal arms are coupled resiliently and so as to be movable relative to each other, is characterized in that the pivotal arms are pairwise movably coupled to the further pivotal arms. In principle, this embodiment requires only one resilient element to establish the resilient coupling between the pivotal arms.

A simple embodiment, which is favourable in respect of production-engineering and in which the centering axis coincides with the axis of rotation of the turntable and the pivotal arms are supported in the frame, is characterized in that the further pivotal arms are also supported in the frame.

An embodiment which enables an information carrier to be moved accurately into and out of the disc-record player in a well-defined plane is characterized in that the centering elements and/or the further centering elements are constructed as pins or rollers each having a conical circumferential surface, the central axis extending parallel to the further pivotal axes.

It is to be noted that German Patent Specification 35 13 040 discloses a disc-record player comprising a transport device for moving optical discs of one specific diameter towards a turntable. The transport device comprises a pair of mutually coupled pivotal members and a pair of rectilinearly movable slide members coupled to the pivotal members. Said members each comprise a gripping element for cooperation with a disc edge. A release device ensures that the gripping elements release a disc situated near the turntable. The transport device of this prior-art optical disc player comprises a large number of parts and is intricate both as regards its construction and operation.

BRIEF DESCRIPTION OF THE DRAWING

The invention will now be described in more detail, by way of example, with reference to the drawings in which.

DETAILED DESCRIPTION OF THE PREFERRED EMBODIMENT

Figure 1:
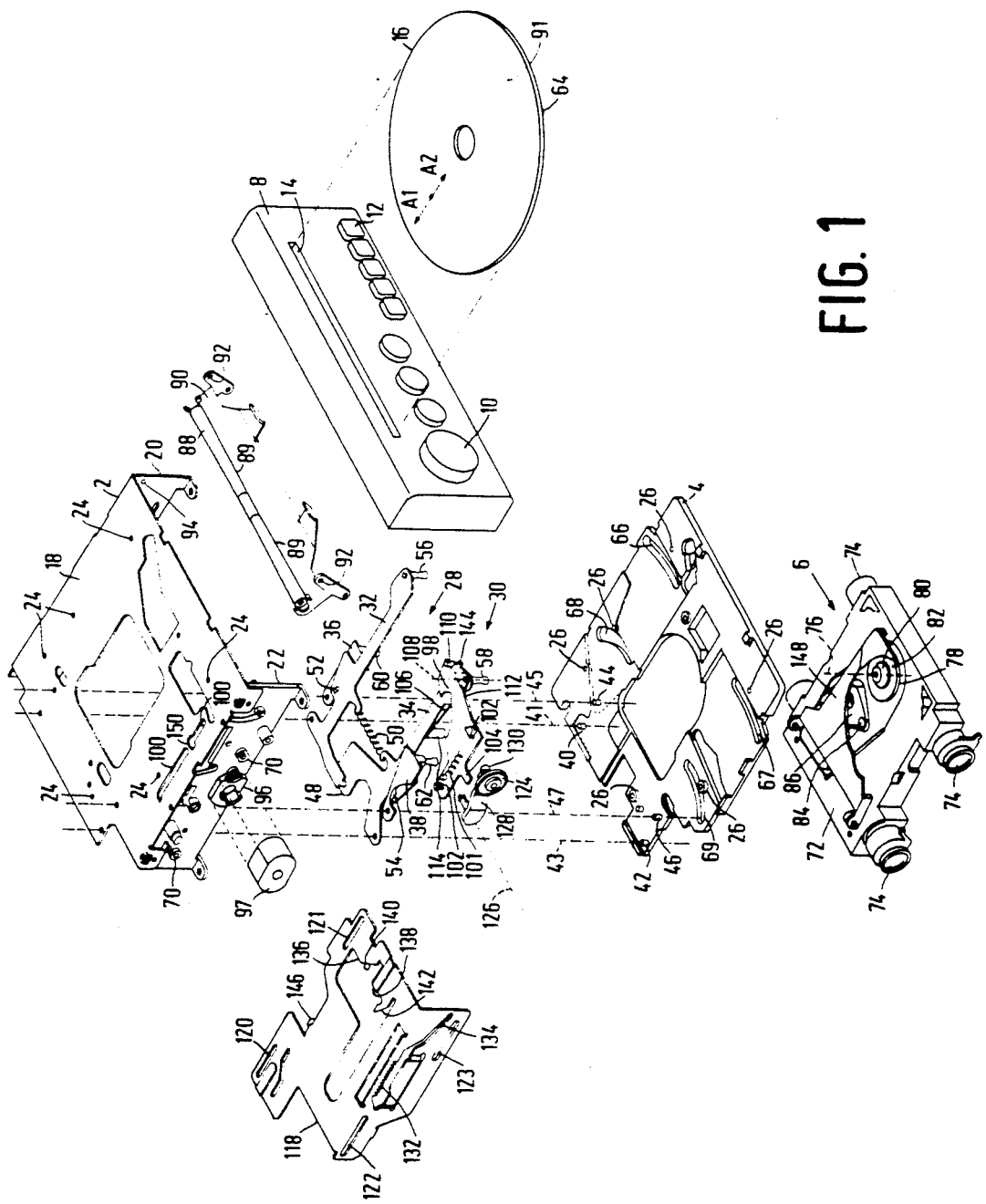
FIG. 1 is an exploded view showing a disc-record player in accordance with the invention, comprising a centering device.

The disc-record player in accordance with the invention shown in FIG. 1 is suitable for inscribing and/or reading optical information carriers such as CDs and CD-singles. The disc-record player comprises a metal housing 2, a flat plastic frame 4 secured in the housing 2, and an optical scanning device 6 secured in the housing 2. The housing 2 is arranged in a casing of which only a front wall 8 is shown. The front wall 8, which carries control knobs and keys 10 and 12, is formed with a slot 14 for moving an optical disc 16, for example a CD, into and out of the player in a loading direction A1 and an unloading direction A2 respectively.

The housing 2 comprises a main wall 18 and two side walls 20 and 22. The main wall 18 is formed with six holes 24, which correspond to six holes 26 in the frame 4. The frame 4 is secured to the inner side of the main wall 18 of the housing 2 by means of bolts passed through the holes 24 and 26.

The disc-record player shown in FIG. 1 further comprises a centering device 28 and, connected thereto, a detection unit 30 for detecting the position of the information carriers, hereinafter referred to as disc-position detection unit. The centering device 28 comprises a pair of pivotal arms 32 and 34, hereinafter referred to as first pivotal arms, and a pair of further pivotal arms 36 and 38, hereinafter referred to as second pivotal arms. The first pivotal arms 32 and 34 are supported on the frame 4 by means of journals 40 and 42 so as to be pivotable about pivotal axes 41 and 43 respectively, hereinafter referred to as first pivotal axes. The second pivotal arms 36 and 38 are supported on the frame 4 by means of journals 44 and 46 respectively so as to be pivotable about pivotal axes 45 and 47 respectively, hereinafter referred to as second pivotal axes. A tension spring 50 is arranged between the first pivotal arms 32 and 34, which are movably coupled to each other by means of a pin-slot linkage 48 so that pivotal movement. The second pivotal arms 36 and 38 are movably coupled to the first pivotal arms 32 and 34 respectively by means of two pin-slot linkages 52 and 54. The first pivotal arms 32 and 34, which are made of a metal, comprise a centering element 56 and 58 respectively, hereinafter referred to as first centering elements, and the second pivotal arms 36 and 38, which are made of a plastics, comprise further centering elements 60 and 62, hereinafter referred to as second centering elements. The centering elements 56, 58, 60 and 62, which are adapted to cooperate with a circumferential edge 64 of an optical disc, may be constructed as cylindrical rollers or pins but preferably have a conical or double conical shape, the central axes of the centering elements 56, 58, 60 and 62 extending parallel to the pivotal axes 41, 43, 45 and 47. The frame 4 is formed with four slots 66, 67, 68 and 69 through which the centering elements 56, 58, 60 and 62 project to allow them to cooperate with the circumferential edge 64 of an optical disc.

The optical scanning device 6, which is of a type known per se, for example as disclosed in U.S. patent specification Ser. No. 4,403,316 (herewith incorporated by reference), is connected to the housing 2 by means of four pins passed through holes 70 in the side walls 20 and 22 of the housing 2 and a mounting plate 72 with four damping elements 74 and springs. The scanning device 6 comprises a turntable 78 which is rotatable about an axis of rotation 76 and which comprises a centering mandrel 80 and a supporting surface 82 for an optical disc. The axis of rotation 76 extends parallel to the mutually parallel first and second pivotal axes 41, 43, 45 and 47. The scanning device 6 further comprises a scanning unit 84, which comprises an objective and which in the present example is secured to a pivotal arm 86.

An optical disc 16 inserted into the opening 14 in the front wall 8 is positioned between the centering elements 56, 58, 60 and 62 of the centering device 28 and above the turntable 78 of the scanning device 6 by means of an automatically operating loading device. In the present example the loading device comprises a disc drive roller 88, which is rotatably journalled in a pivotable roller holder 90. The roller holder 90 has two holes 92 which correspond to two holes 94 in the side walls 20 and 22 of the housing 2, the roller holder 90 being supported by means of two trunnions extending through the holes 92 and 94. The roller 88, which is known per se from European Patent Application 0,296,829 (herewith incorporated by reference), is driven by means of an electric motor 97 via a gear-wheel transmission, not shown, said motor being secured to a mounting portion 96 of the side wall 22 of the housing 2. During introduction of an optical disc 16 two slightly conical circumferential surfaces 89 of the roller 88 cooperate with a side face 91 of the optical disc, the optical disc then being situated between the roller 88 and the frame 4 and consecutively coming into contact with the first centering elements 56 and 58 and the second centering elements 60 and 62. The loading movement ceases once the optical disc has assumed the desired centered position.

Figure 2:
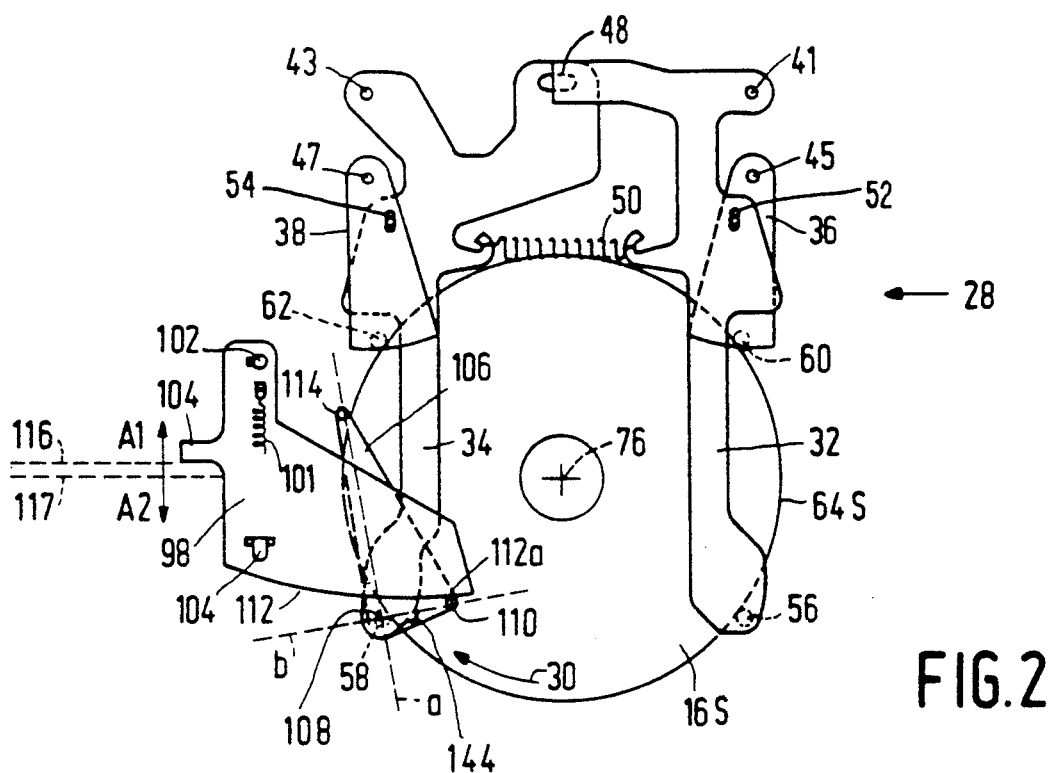
FIG. 2 is a plan view showing the centering device with a CD-single in a centered position.

FIG. 2 shows a situation in which a CD-single, referenced 16S, having a diameter of 8 cm is brought into a desired centered position by means of the centering device 28. In the disc-record player in accordance with the invention this centered position is dictated by the location of the turntable 78, so that the axis of rotation 76 of the turntable 78 is the centering axis. The disc 16S is then clamped between the first and the second centering elements 56, 58, 60 and 62. The centering elements 56, 58, 60 and 62, which engage against the circumferential edge 64S of the disc 16S, are situated on a circle whose center is situated on the axis of rotation 76. Each of the centering elements contacts the disc in a respective different one of the four quadrants of the circle, so that the disc is centered both longitudinally and transversely. The circle consequently corresponds to the circumferential edge 64S of the CD-single and has a diameter of 8 cm.

Figure 3:
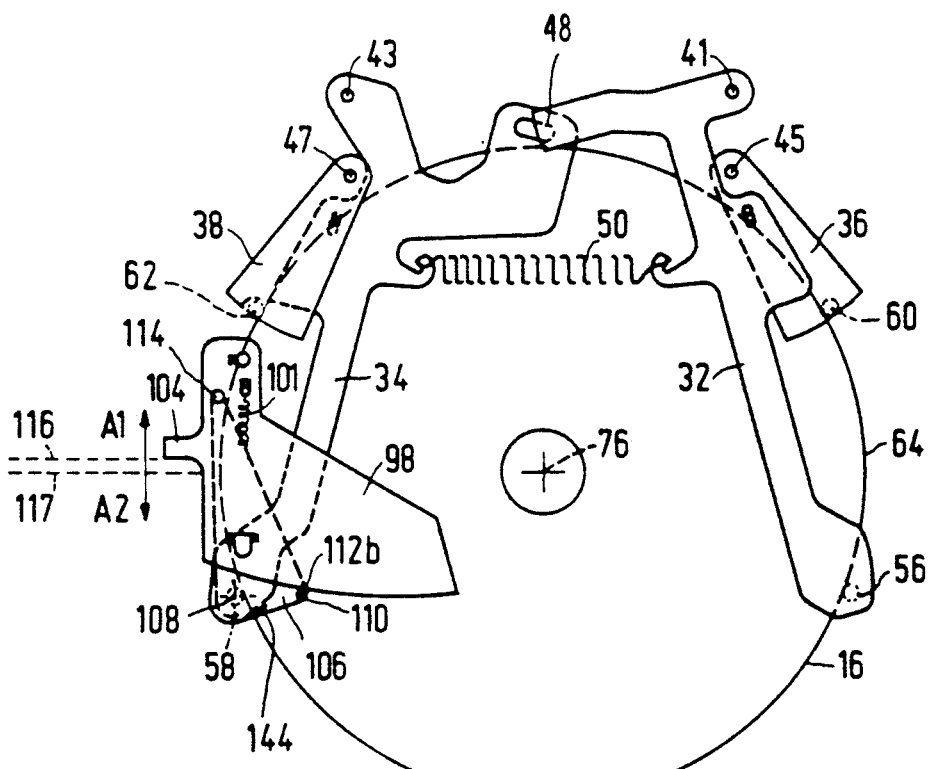
FIG. 3 is a plan view showing the centering device with a CD in a centered position.

In the situation illustrated in FIG. 3 a CD, bearing the reference numeral 16, is in the centered position, in which the central axis of the disc coincides with the axis of rotation 76 of the turntable. In this situation the first centering elements 56 and 58 and the second centering elements 60 and 62 are all situated on a circle whose center is situated on the axis of rotation 76. As in the use of the 8 cm disc, each of the centering elements contacts the disc in a respective different one of the four quadrants of the circle, so that the disc is centered both longitudinally and transversely. This circle corresponds to the circumferential edge 64 of the CD and has a diameter of 12 cm. In the situation shown in FIG. 3, the first pivotal arms 32 and 34 and the second pivotal arms 36 and 38, as is apparent from the drawings, have been pivoted apart through a specific angle about their respective pivotal axes 41, 43, 45 and 47 in comparison with the situation shown in FIG. 2.

The disc-position detection unit 30 of the disc-record player in accordance with the invention shown in FIG. 1 is intended for detecting the position, in particular the centered position, of an optical disc which has been loaded into the player and comprises a sliding member 98 which is movable in the loading direction A1 and in the opposite unloading direction A2. The sliding member 98 is supported to be slidable relative to the housing 2 by means of two trunnions 102 which engage slots 100 in the housing. A helical spring 101 is arranged between the sliding member 98, which is provided with a servo-element 104, and the housing 2. The detection unit 30 further comprises a rotary member 106 which is rotatable about an axis of rotation 108 and which is supported on the pivotal arm 34. The axis of rotation 108 coincides with the central axis of the centering element 58 and extends parallel to the pivotal axis 43 of the pivotal arm 34. The rotary member 106 comprises a guide element 110 in the form of a projection or pin for cooperation with a guiding edge 112 of the sliding member 98. The guide edge 112 has at least two portions 112a and 112b (see FIGS. 2 and 3 respectively) which are situated approximately on a circle whose center is situated on or near the pivotal axis 43. The rotary member 106 carries a pin-shaped detection element 114 adapted to cooperate with the circumferential edge 64 or 64S of an optical disc 16 or 16S which has been loaded into the disc-record player. The rotary member has such a shape that the straight line a through the axis of rotation 108 and the detection element 114 extends at an angle of substantially 90° relative to the straight line b through the axis of rotation 108 and the guide element 110 (see FIG. 2).

The operation of the detection unit 30 will be described in detail with reference to FIGS. 2 and 3. As already mentioned, FIG. 2 illustrates the situation in which a CD-single 16S is in the centered position which is related to the position of the turntable 78 and in which the central axis of the disc 16S coincides with the axis of rotation 76 of the turntable 78. The rotary member 106 of the detection unit 30 occupies such a position that the detection element 114 engages against the circumferential edge 64S of the disc. When the disc 16S is moved to the centered position the sliding member 98 is moved against the action of the spring 101 in a direction parallel to the loading direction A1 as a result of the cooperation between the guide element 110 and the guiding edge 112, in particular the portion 112a of this edge. The above construction of the detection unit 30 ensures that the servo element 104 passes a pre-defined marking line 116 on the frame 4 exactly at the instant at which an inserted optical disc reaches the centered position. If there is no disc in the disc-record player the servo element 104 is situated at the location of the broken line 117.

As stated hereinbefore, FIG. 3 illustrates the situation in which a Compact Disc 16 is in the desired centered position. Since the diameter of the disc 16 is larger than that of the disc 16S the first pivotal arms 32 and 34 and the second pivotal arms 36 and 38 are spread further apart than in the situation illustrated in FIG. 2. As a result of the movement of the pivotal arm 34 the axis of rotation 108 of the rotary member 106 is displaced sideways and as a result of the larger disc diameter the detection element 114 is also moved sideways. As a result of these movements the guide element 110 has moved to the area 112b of the guiding edge 112, the sliding member 98 being moved in the direction A1. In the position shown, in which the disc 16 is exactly in the centered position, the servo element 104 is again situated on the marking line 116.

The disc-record player shown in FIG. 1 comprises a command element 118 which is supported on the housing 2 so as to be movable in the directions A1 and A2. For this purpose the command element 118 has four guide slots 120, 121, 122 and 123 engaged by guide pins on the main wall 18 and the side wall 22 of the housing 2. The command element 118 is driven by the electric motor 97 via a gear wheel transmission. The gear wheel transmission comprises a gear wheel 124. The gear wheel 124 is arranged on a tilting arm 128 which is movable about a pivotal axis 126 and which is supported in the side wall 22 of the housing 2. The tilting arm 128 has a surface 130 for cooperation with the servo element 104 of the detection unit 30. During loading of an optical disc the tilting arm 128 is pressed against the servo element 104 at the location of the surface 130 under the influence of friction or spring force. However, when an optical disc reaches the centered position the servo element clears the surface 130 as a result of the movement of the sliding member 98 in the direction A1 and the tilting arm is tilted until the gear wheel 124 meshes with a gear rack 132 of the command element 118, so that a mechanical coupling is established between the motor 97 and the command element 118. After said tilting of the tilting arm 128 the drive of the disc drive roller 88 is stopped via a mechanism which is shown only partly.

The command element 118 has an inclined slot 134 which is engaged by a spindle, not shown, of a mechanism which is coupled to the roller holder 90. The command element 118 further comprises two peripheral portions 136 and 138 for cooperation with the guide element 110, the guide element 110 being situated at the location of the peripheral portion 136 in the centered position of a CD-single and the guide element 110 being situated at the location of the peripheral portion 138 in the centered position of a CD. The command element 118 further comprises two inclined edges 140 and 142 for cooperation with a projection 144 of the rotary member 106, the projection 144 being situated at the location of the inclined edge 140 in the centered position of a CD-single and the projection 144 being situated at the location of the inclined edge 142 in the centered position of a CD. A lateral edge of the command element 118 further carries an actuating projection 146 for cooperation with a disc-pressure member 148. If after centering of an optical disc 16 or 16S the command element 118 is coupled to the drive motor 97 by tilting of the tilting arm 128 the first centering elements 56 and 58, the second centering elements 60 and 62, the detection element 114 and the roller 88 are moved to a desired distance from the disc during the movement of the command element in the direction A1 and the disc-pressure member 148 presses the disc against the supporting surface 82 of the turntable 78.

In order the remove an optical disc from the turntable and move it outwards the command element is moved in the direction indicated by the arrow A2 by means of the motor 97, the spring 50 arranged between the first pivotal arms 32 and 34 and the spring 101 arranged between the sliding member 98 and an edge portion 150 of the housing 2 ensuring that all the centering elements 56, 58, 60 and 62 and the detection element 114 are moved towards the disc circumference. The spring 50 then provides enough spring force to move the disc which lies on the turntable so far along the axis of rotation 76 of the turntable 78 by means of the double conical centering elements 56, 58, 60 and 62 that the disc can be moved outwards over the centering cone 80 when the roller is driven in the appropriate direction. If desired, the last-mentioned function of the centering elements may be performed by the roller 88.

It will be appreciated that the invention is not limited to the embodiment shown in the drawings. For example, disc-record players constructed to scan more than two discs of different diameters and disc-record players constructed to inscribe and/or read two discs of diameters other than those mentioned in the example also fall within the scope of the invention.

We claim:

1. A disc-record player for scanning a rotating disc-shaped information carrier having a circumferential edge, comprising:
   a frame;
   a turntable comprising a supporting surface for said information carrier; and means for rotating said turntable with respect to said frame, during operation, about an axis of rotation; and
   a centering device comprising a pair of pivotal arms and a pair of further pivotal arms, each of said arms comprising a respective centering element arranged for engaging said circumferential edge to bring said information carrier into a centered position relative to a centering axis which is at least parallel to said axis of rotation during a centering operation; means for mounting said pair of pivotal arms for pivotal movement about respective arm axes which are parallel to said centering axis, are spaced from each other and are fixed with respect to said frame; and means for mounting said pair of further pivotal arms for pivotal movement about respective further arm axes which are parallel to said centering axis, and are spaced from each other, characterized in that said device further comprises:
   means for coupling one of said pivotal arms to one of said further pivotal arms, at a location spaced from said arm axes and said further arm axes, to cause pivotal movement of said one of said further pivotal arms responsive to pivotal movement of said one of said pivotal arms; and
   means for coupling the other of said pivotal arms to the other of said further pivotal arms, at an other location spaced from said arm axes and said further arm axes, to cause pivotal movement of said other of said further pivotal arms responsive to pivotal movement of said other of said pivotal arms;
   each of said further arm axes being spaced from each of said arm axes; and
   each of said arms with their respective centering elements and each of said means for coupling being arranged such that, in at least one position of said pair of pivotal arms, said centering elements are disposed at least substantially on a circle concentric with said centering axis.

2. A player as claimed in claim 1, characterized in that said further arm axes are fixed with respect to said frame, and the device further comprises means for coupling said pair of arms to each other for symmetrical pivotal movement.

3. A player as claimed in claim 2, characterized in that, in said at least one position, each of said respective centering elements engages said circumferential edge in a respective different quadrant of said circle, whereby said information carrier is centered both longitudinally and transversely.

4. A player as claimed in claim 3, characterized in that said means for coupling one of said pivotal arms to one of said further pivotal arms, and said means for coupling the other of said pivotal arms to the other of said further pivotal arms, each comprise a respective pin-slot linkage.

5. A player as claimed in claim 1, characterized in that, for centering information carriers of mutually different diameters, each of said arms with their respective centering elements and each of said means for coupling are arranged such that, in a further position of said pair of pivotal arms, said centering elements are disposed at least substantially on a further circle concentric with said centering axis, said circle and said further circle corresponding to said mutually different diameters.

6. A player as claimed in claim 1, characterized in that, in said at least one position, each of said respective centering elements engages said circumferential edge in a respective different quadrant of said circle, whereby said information carrier is centered both longitudinally and transversely.

7. A player as claimed in claim 6, characterized in that said means for coupling one of said pivotal arms to one of said further pivotal arms, and said means for coupling the other of said pivotal arms to the other of said further pivotal arms, each comprise a respective pin-slot linkage.

8. A player as claimed in claim 1, characterized in that said means for coupling one of said pivotal arms to one of said further pivotal arms, and said means for coupling the other of said pivotal arms to the other of said further pivotal arms, each comprise a respective pin-slot linkage.

9. A disc-record player for scanning a rotating disc-shaped information carrier having a circumferential edge, and having either of two mutually different diameters, comprising:
 a frame;
 a turntable comprising a supporting surface for said information carrier; and means for rotating said turntable with respect to said frame, during operation, about an axis of rotation; and
 a centering device comprising a pair of pivotal arms and a pair of further pivotal arms, each of said arms comprising a respective centering element arranged for engaging said circumferential edge to bring said information carrier into a centered position relative to a centering axis which is at least parallel to said axis of rotation during a centering operation; means for mounting said pair of pivotal arms for pivotal movement about respective arm axes which are parallel to said centering axis, are spaced from each other and are fixed with respect to said frame; and means for mounting said pair of further pivotal arms for pivotal movement about respective further arm axes which are parallel to said centering axis, and are spaced from each other, characterized in that said device further comprises:
 means for coupling one of said pivotal arms to one of said further pivotal arms, at a location spaced from said arm axes and said further arm axes, to cause pivotal movement of said one of said further pivotal arms responsive to pivotal movement of said one of said pivotal arms; and
 means for coupling the other of said pivotal arms to the other of said further pivotal arms, at an other location spaced from said arm axes and said further arm axes, to cause pivotal movement of said other of said further pivotal arms responsive to pivotal movement of said other of said pivotal arms;
 each of said further arm axes being spaced from each of said arm axes, and fixed with respect to said frame,
 each of said arms with their respective centering elements and each of said means for coupling being arranged such that, in one position of said pair of pivotal arms, said centering elements are disposed at least substantially on a circle having a diameter equal to one of said mutually different diameters, concentric with said centering axis, and
 each of said arms with their respective centering elements and each of said means for coupling being arranged such that, in another position of said pair of pivotal arms, said centering elements are disposed at least substantially on a circle having a diameter equal to the other of said mutually different diameters, concentric with said centering axis.

10. A player as claimed in claim 9, characterized in that said centering elements each comprise pins or rollers each having a respective central axis and a respective conical circumferential surface, said central axes extending parallel to said centering axis.

11. A disc-record player for scanning a rotating disc-shaped information carrier having a circumferential edge, and having either of two mutually different diameters, comprising:
 a frame;
 a turntable comprising a supporting surface for said information carrier; and means for rotating said turntable with respect to said frame, during operation, about an axis of rotation; and
 a centering device comprising a pair of pivotal arms and a pair of further pivotal arms, each of said arms comprising a respective centering element arranged for engaging said circumferential edge to bring said information carrier into a centered position relative to a centering axis which is at least parallel to said axis of rotation during a centering operation; means for mounting said pair of pivotal arms for pivotal movement about respective arm axes which are parallel to said centering axis, are spaced from each other and are fixed with respect to said frame; and means for mounting said pair of further pivotal arms for pivotal movement about respective further arm axes which are parallel to said centering axis, and are spaced from each other, characterized in that said device further comprises:
 means for coupling one of said pivotal arms to one of said further pivotal arms, at a location spaced from said arm axes and said further arm axes, to cause pivotal movement of said one of said further pivotal arms responsive to pivotal movement of said one of said pivotal arms;
 means for coupling the other of said pivotal arms to the other of said further pivotal arms, at an other location spaced from said arm axes and said further arm axes, to cause pivotal movement of said other of said further pivotal arms responsive to pivotal movement of said other of said pivotal arms, and
 means for coupling said pair of arms to each other for symmetrical pivotal movement;
 each of said further arm axes being spaced from each of said arm axes, and fixed with respect to said frame,
 each of said arms with their respective centering elements and each of said means for coupling being arranged such that, in one position of said pair of pivotal arms, said centering elements are disposed at least substantially on a circle having a diameter equal to one of said mutually different diameters, concentric with said centering axis, and
 each of said arms with their respective centering elements and each of said means for coupling being arranged such that, in another position of said pair of pivotal arms, said centering elements are disposed at least substantially on a second circle having a diameter equal to the other of said mutually different diameters, concentric with said centering axis, and in said another position, each of said respective centering elements engages said circumferential edge in a respective different quadrant of said second circle, whereby said information carrier is centered both longitudinally and transversely.

12. A player as claimed in claim 11, characterized in that said means for coupling said pair of arms to each other for symmetrical pivotal movement comprises a pin-slot linkage.

13. A player as claimed in claim 12, characterized in that said means for coupling one of said pivotal arms to one of said further pivotal arms, and said means for coupling the other of said pivotal arms to the other of said further pivotal arms, each comprise a respective pin-slot linkage.

14. A player as claimed in claim 13, characterized in that said means for coupling one of said pivotal arms to one of said further pivotal arms, and said means for coupling the other of said pivotal arms to the other of said further pivotal arms, each comprise a respective pin-slot linkage.

* * * * *